United States Patent
Dowell

[15] 3,637,326
[45] Jan. 25, 1972

[54] MANUAL CONTROL FOR PRESSURE-RESPONSIVE SWITCH OF A SUBMERSIBLE MOTOR AND PUMP

[72] Inventor: Winston C. Dowell, Box 313 Mullen Lane, Highland Springs, Va. 23075

[22] Filed: Jan. 22, 1970

[21] Appl. No.: 4,814

[52] U.S. Cl. ............................................................. 417/44
[51] Int. Cl. ........................................................ F04b 49/06
[58] Field of Search ....................... 417/18, 38, 44, 472, 437; 92/91, 92; 60/62.6

[56] References Cited

UNITED STATES PATENTS

| | | | |
|---|---|---|---|
| 2,562,847 | 7/1951 | Spencer | 60/62.6 X |
| 2,686,006 | 8/1954 | Hasselquist | 417/437 |
| 2,933,570 | 4/1960 | Tutthill | 417/38 |
| 2,837,017 | 6/1958 | Hough | 92/92 |
| 3,013,534 | 12/1961 | Marette | 92/92 |
| 3,234,739 | 2/1966 | Pierce | 417/472 |
| 3,234,881 | 2/1966 | Ekey | 417/38 |

Primary Examiner—William L. Freeh
Attorney—Elizabeth Newton Dew

[57] ABSTRACT

Device for manual control of a pressure-responsive switch of a motor driving a submerged pump, irrespective of hydraulic pressure effective upon the switch. A sealed flexible bellows is pneumatically connected at ground level, into the tubular conduit including current-conducting cables extending to the submerged pressure-responsive switch of the motor, and enables reduction of pressure effective upon the switch to energize the motor when desired. The sealed bellows, while effective and efficient for its intended purpose, avoids the possibility of flooding of the switch, water damage to the motor, and the entrance of dirt and moisture into the switch mechanism.

3 Claims, 4 Drawing Figures

PATENTED JAN 25 1972

3,637,326

INVENTOR
WINSTON C. DOWELL

BY Elizabeth Newton Dew

ATTORNEY

MANUAL CONTROL FOR PRESSURE-RESPONSIVE SWITCH OF A SUBMERSIBLE MOTOR AND PUMP

This invention relates to a pneumatic control for the switch or circuit closer of a normally submerged motor-pump combination.

In apparatus of the type mentioned, a combined motor and pump are normally submerged at a desired depth below the surface of a body of water or other liquid whose level is to be controlled. The motor is within its fluid- and pressuretight casing and is controlled by a switch of the diaphragm type, for example, responsive to the hydraulic pressure effective at the level of the pump. When, for instance, the level of the body of liquid rises to a certain distance above the level of the pump and its motor, the hydraulic pressure effective upon the diaphragm switch effects closure of the motor circuit and the resulting energization of the motor and operation of the pump causes a discharge of liquid to lower the level thereof to a predetermined value which may be determined by setting or adjustment of the switch. While the invention has a wide range of uses, merely as examples may be mentioned the control of water or other liquid accumulating in a tank, sump, ship's bilge, or other enclosed volume.

At times it is desirable to control the pump motor manually as in testing or repairing and like situations. In such cases, the cables leading from the surface, down to the motor and pump may be encased within a fluid- and pressuretight flexible tube or conduit. The conduit is so connected with the diaphragm or other pressure-responsive item of the submerged switch, that the absolute pressure therewithin is effective on the side thereof opposite to that upon which the hydraulic pressure is applied.

Normally, that is in usual operation, this absolute pressure is the same as atmospheric or ambient so that when the hydraulic pressure upon the diaphragm rises to a set or predetermined value, the motor is energized and liquid is discharged until the controlled body of liquid drops to the desired and also predetermined level.

When, for any reason it is necessary or desirable to energize the submerged motor without regard to the fact that the level of liquid in the tank or sump may be below the aforesaid predetermined value, means are provided by which the absolute pressure in the cable conduit may be reduced below atmospheric. The reduced pressure, of course, has the same effect upon the diaphragm of the motor switch, as an increase of hydraulic pressure upon its other or opposite side, so that the motor is energized, as is desired.

In the prior art, reduction of pressure within the conduit leading to the motor switch was effected by a normally expanded flexible bulbous device, as of rubber. The bulb has an aperture in and through its wall and reduced pressure therein and in the conduit leading down to the motor, was brought about by the operator who would first press the bulb to expel some of the air through the aperture. Then the operator would press a finger over the aperture to seal it, then allow the bulb to expand. In so expanding the bulb reduced the pressure on the atmospheric pressure side of the switch diaphragm so that it was thereby flexed in a direction to close the circuit.

The aforesaid prior art construction had serious disadvantages. Due to the aperture in the bulb the interior of the cable conduit leading to the motor or, more particularly, to its pressure-responsive switch, was continuously open to the atmosphere. This permitted the entrance of dust, dirt and moisture into the delicate mechanism of the switch and in time seriously affected its reliability. In fact, such entrance was unavoidable by reason of the normal "breathing" of the system with changes in atmospheric pressure. The result was shortened life for the switch and motor, due to corrosion and the entry of dust and dirt, inaccurate and unsatisfactory response to changes in hydrostatic pressure, and frequent repairs.

Worse yet, when the cable and connected bulb were carelessly or accidentally dropped into the water or other body of liquid the level of which was to be controlled, the bulb, tube and switch could be flooded, or enough water could find its way along the cable and into the switch to render it unreliable or inoperative. When this happened the entire pump and motor assembly had to be withdrawn for cleaning and repair or replacement of the switch. This was a time-consuming and expensive operation.

It is the chief purpose and object of the present invention to overcome and obviate the drawbacks set forth in the preceding paragraphs, by providing an apparatus which, while perfectly satisfactory and effective for its intended purpose of manual control of the motor switch, makes it practically impossible for dust, dirt and moisture to gain access to the switch mechanism of the submerged motor-pump combination.

Another object is to provide a device as aforesaid wherein the possibility of flooding of the motor switch is obviated.

Ancillary to the foregoing objects it is a further object to provide apparatus wherein by reason of the attainments noted, the reliability and long-lived, trouble-free operation of the pump assembly and its controls, is assured.

Other objects and advantages will become clear to those skilled in the art, after a study of the following detailed description, in connection with the accompanying drawing. In the drawing.

Figure 1:
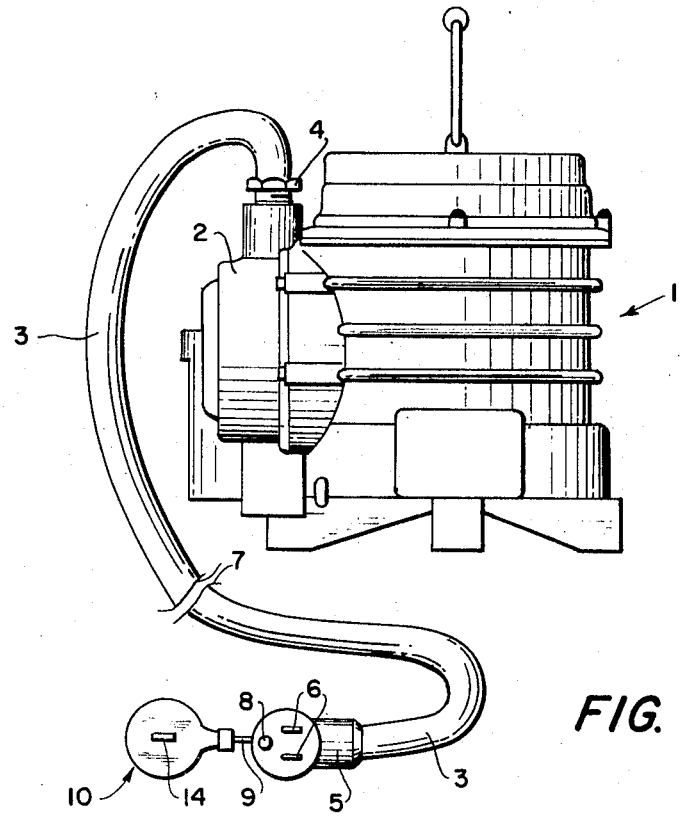
FIG. 1 is a view showing the general combination of motor-pump combination and a section of flexible tubing within which is enclosed wiring leading from the motor switch to a plug equipped with the invention.

Referring in detail to the drawing 1, FIG. 1, indicates generally a motor-pump combination of known type wherein an electric motor may be directly connected with a pump such as one of the centrifugal type. The motor circuit includes a diaphragm, bellows, or other pressure-responsive switch generally identified at 2. It will be understood that the apparatus is intended to be located submerged within a body of liquid, as in a well, tank or sump, the level of which is automatically controlled by flexure under hydrostatic pressure, of a diaphragm type switch forming an integral part of the combination, and connected into the circuit so that the motor is energized by and in response to the rise of the level of the body of liquid to or above a predetermined level. Also understood is that the motor and switch are completely enclosed and protected against the entrance or access of liquid thereinto.

A flexible tube 3 of rubber or synthetic plastic has one end connected to the motor casing as by a fluidtight fitting 4. The other end of the tube, which is of a length sufficient at least, to extend from the motor upwardly to a control station at or above ground level, is equipped with a fluidtight connection to a plug 5 having the usual contact prongs 6 electrically connected with leads 7 which extend in and along the tube. The usual grounded prong of the plug is indicated at 8.

Plug 5 is hollow to thus form a chamber in free communication with the interior of tube 3. The chamber is completely enclosed and pressuretight but has an external aperture which places it in communication through a tubular connection 9, with a bulb generally identified at 10. This bulb has a solid base member 11 of metal, or hard rubber or plastic which is connected with one end of a small pipe 12, FIG. 4.

Figure 2:
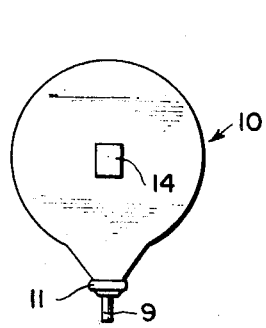
FIG. 2 is a front elevation of the expansible bulb.
Figure 3:
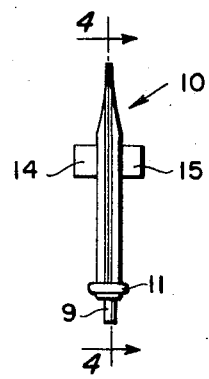
FIG. 3 is a side elevation of the bulb.
Figure 4:
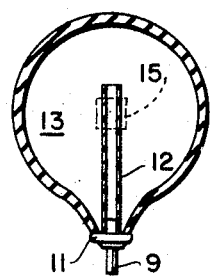
FIG. 4 is a section taken in a plane identified by line 4—4, FIG. 3.

As is clear from inspection of FIGS. 2, 3 and 4, the casing of the bulb is formed of two molded generally flat, round sheets of flexible impervious material such as rubber, connected together at their peripheries, and with base member 11, to form a fluid- and pressuretight chamber 13 with which pipe 12 communicates at one end within the chamber. As shown upon FIG. 4 the pipe extends substantially diametrically somewhat more than halfway across the chamber. The other end of the tube is sealed in or to member or fitting 11 so that changes in pressure within the bulb are communicated, through connection 9, to the interior of plug 5, tube 3 and thence effective upon one side of the diaphragm of the motor switch. Manually graspable tabs 14, 15 are fixedly attached centrally and externally to the respective sidewalls of the bulb. These tabs may be of any desired shape and form so long as they may be readily graspable by an operator.

It will be understood as previously explained, that the other side of the switch diaphragm is in communication with and affected by the hydrostatic pressure of the body of liquid the level of which is to be controlled.

From the foregoing it is clear that when the normally atmospheric or ambient pressure within tube 3 is reduced, the effect upon the diaphragm of the motor switch is the same as an increase in hydrostatic pressure upon its other surface or side. Hence, in use, when it is desired to energize the pump motor irrespective of any particular height of the level of liquid of the controlled body, it is merely necessary for the operator to grasp tabs 14 and 15 and to pull them apart. This increases the volume of the bulb and reduces the pressure in chamber 13, within tube 3, and that effective upon the switch diaphragm, to close the switch and energize the motor. Since the system including bulb 10, tube 3, and switch 2, is completely closed to communication with the atmosphere, it is possible for dirt, dust and moisture to gain entrance to the switch mechanism. Further, should plug 5 be accidentally dropped into the body of liquid, the possibility as is present in the prior art, that the switch may be flooded with resulting necessary withdrawal of the entire pump assembly, is obviated.

While I have shown the form of the invention presently preferred, numerous changes in shape and relation of the parts, the substitution of equivalent parts and materials, and other modifications will readily occur to those skilled in the art, after study of the foregoing disclosure. Hence the description is to be taken in a purely illustrative rather than in a limiting sense.

Having fully disclosed the invention, what I claim and desire to secure by Letters Patent is:

1. In combination with a pump, an electric motor forming an integral assembly with said pump and connected to drive the same, and a hydrostatically operated pressure-responsive switch mounted upon the motor-pump assembly and controlling the circuit of said motor in response to changes in hydrostatic pressure effective upon the switch, said assembly and switch being submersible within a body of liquid whose level is to be controlled, a pressuretight tube having one end in pressuretight communication with said switch, an electrical plug connected in pressuretight communication with the other end of said tube, cables extending within said tube, and electrically connecting said plug to said switch, an expansible, pressuretight bulb in pressuretight communication with said tube contiguous to said plug and means fixed with said bulb and manually operable to expand the volume thereof, said tube, bulb, and switch enclosing a space completely excluded from communication with ambient air and operable in response to reduced absolute pressure therein resulting from manually effected expansion of said volume, to effect closure of said switch.

2. The combination of claim 1, said bulb comprising first and second spaced sheets of flexible material connected together at and along their peripheries, to form an enclosed fluidtight chamber, said manually operable means comprising a pair of tabs each fixedly attached centrally and exteriorly to a respective one of said sheets.

3. In a control for the pressure-responsive diaphragm of a motor submersible within a body of liquid, pressure-control means forming an expansible, fluidtight chamber and comprising first and second spaced, substantially parallel sheets of flexible material connected at and along their peripheries to form said chamber, means connected with said pressure-control means, to manually expand the volume of said chamber and comprising first and second manually graspable tabs each fixed centrally and externally to a respective one of said sheets and directly opposite one another, and tubular means forming a fluidtight communication between said chamber and said diaphragm, said tubular means including a solid base member connected with the peripheral portion of said sheets, and a pipe fixed at one end with said base member and extending radially in and across said chamber, with its other end in open communication therewith, manual expansion of said chamber reducing the absolute pressure effective on said diaphragm to thus energize the motor by and in response to expansion of volume of said pressure control means.

* * * * *